United States Patent
Gu et al.

(10) Patent No.: US 10,685,186 B2
(45) Date of Patent: Jun. 16, 2020

(54) SEMANTIC UNDERSTANDING BASED EMOJI INPUT METHOD AND DEVICE

(71) Applicant: BEIJING SOGOU TECHNOLOGY DEVELOPMENT CO., LTD., Beijing (CN)

(72) Inventors: Siyu Gu, Beijing (CN); Huasheng Liu, Beijing (CN); Kuo Zhang, Beijing (CN)

(73) Assignee: BEIJING SOGOU TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 15/306,587

(22) PCT Filed: Jun. 5, 2015

(86) PCT No.: PCT/CN2015/080925
§ 371 (c)(1),
(2) Date: Oct. 25, 2016

(87) PCT Pub. No.: WO2015/185019
PCT Pub. Date: Dec. 10, 2015

(65) Prior Publication Data
US 2017/0052946 A1 Feb. 23, 2017

(30) Foreign Application Priority Data
Jun. 6, 2014 (CN) .......................... 2014 1 0251399

(51) Int. Cl.
*G06F 17/27* (2006.01)
*G06F 40/35* (2020.01)
(Continued)

(52) U.S. Cl.
CPC ............ *G06F 40/35* (2020.01); *G06F 40/247* (2020.01); *G06F 40/274* (2020.01); *G06F 40/53* (2020.01); *H04L 51/046* (2013.01)

(58) Field of Classification Search
CPC ....................................................... G06F 17/27
(Continued)

(56) References Cited

U.S. PATENT DOCUMENTS 8,781,991 B2 * 7/2014 Lee .................. A61B 5/165
706/52
8,996,639 B1 * 3/2015 Faaborg ................. H04L 51/02
455/412.1

(Continued)

FOREIGN PATENT DOCUMENTS

CN 101047923 A 10/2007
CN 102955830 A 3/2013
(Continued)

OTHER PUBLICATIONS

The World Intellectual Property Organization (WIPO) International Search Report for PCT/CN2015/080925 dated Aug. 26, 2015 pp. 1-6.

*Primary Examiner* — Michael Colucci
(74) *Attorney, Agent, or Firm* — Anova Law Group, PLLC

(57) ABSTRACT

The present disclosure provides a semantic understanding based emoji input method and device, and relates to the input method technology field. The method includes: obtaining a text content according to an input sequence; performing word segmentation on the text content, and extracting text features based on the word segmentation result; constructing an input vector using the text features, performing classification using an emotion classification model to determine an emotion label of the text content; based on a correspondence relationship between the emotion label and (Continued)

emojis of various themes, respectively obtaining an emoji corresponding to the emotion label from each of the various themes; sorting the obtained emojis of the various themes, and displaying the sorted emojis as candidate options in a client. The disclosed invention facilitates users to input an emoji, enhances emoji input efficiency, and provides users with rich and wide scope of emoji resources.

21 Claims, 7 Drawing Sheets

(51) Int. Cl.
*G06F 40/53* (2020.01)
*G06F 40/247* (2020.01)
*G06F 40/274* (2020.01)
*H04L 12/58* (2006.01)

(58) Field of Classification Search
USPC ........... 704/500, 94, 277, 270, 260, 235; 455/566; 345/629, 173, 156; 706/52, 16, 706/11
See application file for complete search history.

(56) References Cited

U.S. PATENT DOCUMENTS

| | | | |
|---|---|---|---|
| 9,063,927 B2* | 6/2015 | Hall | G06F 17/2785 |
| 9,202,142 B1* | 12/2015 | Conboy | G06K 9/6267 |
| 2002/0054047 A1* | 5/2002 | Toyama | G06T 13/40 |
| | | | 345/629 |
| 2003/0212563 A1* | 11/2003 | Ju | G06F 3/018 |
| | | | 704/277 |
| 2005/0261032 A1* | 11/2005 | Seo | A63F 13/12 |
| | | | 455/566 |
| 2007/0171192 A1* | 7/2007 | Seo | H04M 1/72544 |
| | | | 345/156 |
| 2007/0208569 A1* | 9/2007 | Subramanian | G10L 19/0018 |
| | | | 704/270 |
| 2010/0235451 A1 | 9/2010 | Yu et al. | |
| 2011/0112826 A1* | 5/2011 | Wang | G06F 17/2785 |
| | | | 704/9 |
| 2012/0330869 A1* | 12/2012 | Durham | G06N 5/022 |
| | | | 706/16 |
| 2013/0154980 A1* | 6/2013 | Byrnes | G06F 3/01 |
| | | | 345/173 |
| 2013/0231922 A1* | 9/2013 | Park | G06F 17/2735 |
| | | | 704/9 |
| 2014/0067397 A1* | 3/2014 | Radebaugh | G10L 13/08 |
| | | | 704/260 |
| 2014/0088954 A1* | 3/2014 | Shirzadi | G06F 17/24 |
| | | | 704/9 |
| 2014/0222721 A1* | 8/2014 | Stock | G06Q 50/01 |
| | | | 706/11 |
| 2014/0279418 A1* | 9/2014 | Rubinstein | G06Q 40/00 |
| | | | 705/39 |
| 2014/0363074 A1* | 12/2014 | Dolfing | G06K 9/00979 |
| | | | 382/156 |
| 2015/0100537 A1* | 4/2015 | Grieves | G06N 5/048 |
| | | | 706/52 |
| 2015/0222617 A1* | 8/2015 | Ebersman | H04L 51/12 |
| | | | 726/4 |
| 2015/0302301 A1* | 10/2015 | Petersen | G06N 5/04 |
| | | | 706/11 |
| 2017/0098122 A1* | 4/2017 | el Kaliouby | A61B 5/744 |

FOREIGN PATENT DOCUMENTS

| | | |
|---|---|---|
| CN | 103064826 A | 4/2013 |
| CN | 104063427 A | 9/2014 |

\* cited by examiner

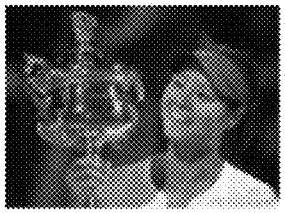

23:51 Jan 25   From: Sina Weibo                    Forward (948)    Comments (1216)

FIG. 3

```
With regard to a first emoji of each theme, according
to a matching relationship between the first emoji         S104
and a second emoji, obtaining text content
correlated with the first emoji from the chat language
resource data
```

```
Extracting natural language text features from the        S105
text content correlated with the first emoji
```

```
According to the emotion label and the text feature       S106
corresponding to the first emoji, training an emotion
classification model
```

FIG. 4

SEMANTIC UNDERSTANDING BASED EMOJI INPUT METHOD AND DEVICE

CROSS-REFERENCES TO RELATED APPLICATIONS

This application is a national phase entry under 35 U.S.C. § 371 of International Application No. PCT/CN2015/080925, filed on Jun. 5, 2015, which claims the priority to Chinese Patent Application No. 201410251399.0, entitled "Semantic understanding based emoji input method and device", filed to the State Intellectual Property Office of China on Jun. 6, 2014, the entire contents of all of which is incorporated herein by reference.

FIELD OF THE DISCLOSURE

The present disclosure generally relates to the input method technology and, more particularly, relates to a semantic understanding based emoji input method and device.

BACKGROUND

An input method is a coding method used to enter various symbols into a computer or other devices (such as a mobile phone). Common input methods include Sogou input method, Microsoft input method and so on.

Traditional emoji input is generally implemented in several situations. First, a platform itself has an emoji input module. For example, messaging tools such as QQ are embedded with an emoji input module that includes a default emoji set for input, allows a third party emoji package to be installed, and allows a user to customize a picture resource as an emoji. When entering an emoji, the user clicks a button for emoji input, and select one emoji to be entered. However, this situation completely excludes the input method; the user needs to click the specific button for emoji input, flip through pages to search and select an emoji that he/she needs and likes to complete the input process.

Second, an input method comes with simple emoticons. When a user enters corresponding characters, for example ("haha" corresponding to an emoticon "O (∩_∩) O~"), the emoticon is presented in the form of a candidate option for user selection. However, candidate emojis in this situation are simple, and cannot provide users with rich and colorful emoji inputs.

Third, an input method provides loaded third-party emoji packages, and provides users with an entrance for emoji input. When a user wants to enter an emoji, the user needs to click the entrance to access the emoji input of the application, and then in a large number of emoji resources, the user may flip through pages to search and select an emoji that he/she needs and likes to complete the input process.

Using a form of a button interface embedded in an application to provide emoji input for users, such method has many problems.

1. User chat behavior happens in instant messaging, which is highly time-sensitive. Thus, the timeliness of emoji input is very important. If a user likes and installs emoji libraries of a variety of themes (including Ali the Fox, YOYO monkey, Rilakkuma, Lengtoo, etc.), and each emoji library contains hundreds of emoticons or pictures (such as smile, laugh out loud, snicker, wiping tears, crying loudly, etc.). Accordingly, in a limited time, the time consumed on searching through a large number of emoji libraries one by one to find the right emoji, can become the bottleneck of enhancing communication effects by efficiently using various emojis.

2. Because operating cost of a user using an emoji is considered, emoji package producers may streamline the emoji contents as appropriate, which also, to some extent, restricted the development and extensive use of chat emoji.

3. Most chat tools only provide default emojis. The default emojis are relatively monotonous, while chatting emoji resources of richer and more diverse themes can effectively improve favorability when chatting with friends. However, in order to use these emojis, the user needs to go through a lot of online operation steps: obtaining information about emoji packages from various sources, downloading emoji packages to local device, and sometimes manually loading the emoji packages so that the emoji packages can be used normally. For users who are unfamiliar with these operations or do not have enough patience, the amount of time costed to successfully acquire, from network resources, and install the suitable emoji packages may cause them to choose to give up.

4. For downloaded emoji packages, if the user switches input scenarios like chat platforms, the emoji packages need to be downloaded again or updated, the information about frequently-used emoji collections is also facing the problem of transplantation.

The to-be-entered candidate emoji contents are limited to ready-made third-party emoji packages. If not being specially arranged, many multimedia resources such as photos and GIFs showing dramatic expressions of celebrities and political figures cannot be timely made as candidate emojis, the input content is too simple and monotonous, and cannot quickly and accurately meet current input needs of users, which reduces user input efficiency.

BRIEF SUMMARY OF THE DISCLOSURE

In view of the aforementioned problems, the present disclosure provides a semantic understanding based emoji input method and device, which solves, or at least partially solves, the problems set forth above.

One aspect of the present disclosure provides a semantic understanding based emoji input method, including:

obtaining a text content according to an input sequence;

performing word segmentation on the text content, and extracting text features based on the word segmentation result;

constructing an input vector using the text features, performing classification using an emotion classification model to determine an emotion label of the text content;

obtaining, from an emoji resource data, a first emoji corresponding to the emotion label; and after sorting the obtained first emoji, displaying the sorted emoji as a candidate option in a client.

Another aspect of the present disclosure provides a semantic understanding based emoji input device, including:

a content obtaining module, configured to obtain a text content according to an input sequence;

a word segmentation and feature extraction module, configured to perform word segmentation on the text content, and extract text features based on the word segmentation result;

an emotion label determination module, configured to construct an input vector using the text features, perform classification using an emotion classification model to determine an emotion label of the text content;

an emoji obtaining module, configured to obtain, from an emoji resource data, a first emoji corresponding to the emotion label; and a presentation module, configured to, after sorting the obtained first emoji, display the sorted emoji as a candidate option in the client.

Another aspect of the present disclosure provides a computer program including computer readable code, when the computer readable code is run on a computer, the aforementioned semantic understanding based emoji input method is executed.

Another aspect of the present disclosure provides a computer readable storage medium, which stores the aforementioned computer program.

Compared with the prior art, embodiments of the present disclosure have the following advantages.

In embodiments of the present disclosure, emoji resource data may be obtained from various sources, chat language resource data may be obtained such as chat log (e.g., anonymous chat logs containing emoji inputs may be obtained from QQ, Wechat and other chat tools), community comments (e.g., content of comments containing emoji inputs from websites like Jingdong, Dianping and so on), social network contents (e.g., status or comments containing emoji inputs from QQ Space, Sina Weibo, Renren and so on), all of the obtained emoji resource data may be analyzed to establish corresponding relationships between emotion labels and emojis of different themes. Further, understanding semantic meanings of the text content obtained from the user input sequence is carried out, and the corresponding text features are obtained. The text features are then classified based on a previously-constructed emotion classification model, to determine an emotion label correlated with the user input. Furthermore, based on the correspondence relationship between the emotion label and first emojis, and the corresponding first emojis are acquired from the emoji resource data as candidate options for user selection.

In the aforementioned process, first, emojis are employed in the thesaurus of the input method, semantic understanding on text content obtained from user input sequence may be directly performed, according to the correspondence relationship between the emotion label obtained according to the semantic understanding and first emojis in the emoji resource data, the first emojis are acquired from the emoji resource data, displayed as candidate options in the input method client, and directly provided to the user for selection.

Second, the aforementioned process can precisely cater emoji input requirements of the user, so the efficiency of emoji usage can be improved, thereby reducing the time cost of the user looking for a to-be-entered emoji during the emoji input process.

Third, in this manner, there is no need to consider the production cost and content of the emoji packages, producers can create freely, reducing constrains on development and widespread of chat emojis.

Fourth, in embodiments of the present disclosure, since emojis of various themes are collectively classified, the user does not need to download emoji packages of the various themes from all over the place, thereby reducing the time cost for the user to search for the emoji packages.

Fifth, in embodiments of the present disclosure, since the first emojis are candidate options in the input method, the user does not need to re-download or update the emoji packages when switching input scenarios such as the chat platforms, and the problem of transplanting information about frequently-used emoji collections can also be avoided.

Sixth, the emoji resource data in embodiments of the present disclosure has a wide range and covers large areas, and can provide the user with larger and richer input corpus.

BRIEF DESCRIPTION OF THE DRAWINGS

Upon reviewing the following detailed description of the preferred embodiments, various advantages and other benefits will become apparent to persons of ordinary skill in the art. The drawings are merely examples for illustrative purposes according to various disclosed embodiments and are not intended to limit the scope of the present disclosure. Further, the same reference numbers will be used throughout the drawings to refer to the same parts. In the drawings:

FIG. 3 illustrates an example of a chat language resource according to one embodiment of the present disclosure;

FIG. 4 illustrates a flow chart of a process for constructing an emotion classification model according to one embodiment of the present disclosure;

DETAILED DESCRIPTION

Figure 1:
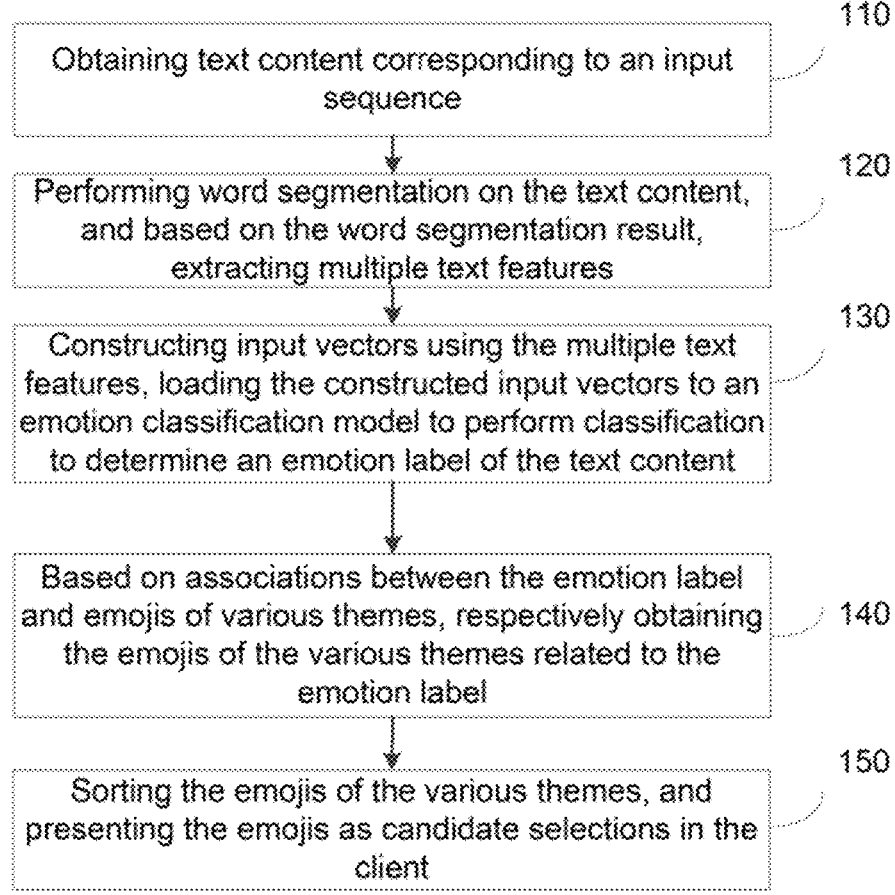
FIG. 1 illustrates a flow chart of a semantic understanding based emoji input method according to one embodiment of the present disclosure.

Exemplary embodiments of the present disclosure will be described in more detail below with reference to the accompanying drawings.

In the present disclosure, emoji resource data from various sources may be obtained, for example, emoji package resources of various themes on the internet (e.g., QQ emoji packages having themes such as Ali the fox, YOYO monkey, dramatic expression photo album of a real person like Guo Degang, etc.), emoji package resources cooperatively produced with a third party (the input method developer and cartoon emoji producer work together and establish a procedure to get emojis), customized emoji contents produced by the users (the input method directly provides an open interface for the users to add and share customized emoji). Chat language resource data may be utilized, such as chat log (e.g., anonymous chat logs containing emoji inputs may be obtained from QQ, Wechat and other chat tools), community comments (e.g., content of comments containing emoji inputs from websites like Jingdong, Dianping and so on), social network contents (e.g., status or comments containing emoji inputs from QQ Space, Sina Weibo, Renren and so on). All of the obtained emoji resource data may be analyzed to establish correspondence relationships between emotion labels and first emojis from the emoji resource data. Further, utilizing the correspondence relationships between the emotion labels and the first emojis from the emoji resource data, an emotion classification model is established. Afterwards, when a user is using the input method, the emotion classification model is used to semantically identify the text content inputted by the user, and then the emoji candidate is provided directly to the client based on the identification result, thereby providing the user with more convenient, quicker and richer emoji input.

Embodiment 1

First, in embodiments of the present disclosure, an emotion classification model for semantic analysis is constructed, and correspondence relationships between emotion labels and emojis are also established. The emotion label can be used to represent a semantic emotion that an emoji conveys, which includes but not limited to a happiness emotion label, a compliment emotion label, and so on. The emotion classification model has the ability to classify many types of emotion labels, provided that the number of the emotion labels is N, the emotion classification model can output N classification results.

That is, step S100 includes: according to chat language resource data and emoji resource data of various themes, establishing a correspondence relationship between a first emoji in the emoji resource data and an emotion label.

In embodiments of the present disclosure, the correspondence relationship between the emotion label and the first emoji from the emoji resource data may be obtained by: collecting the chat language resource data and the emoji resource data, and analyzing the emoji resource data using the chat language resource data. In embodiments of the present disclosure, the correspondence relationship between the first emoji included in the emoji resource data and the emotion label may be established online or offline. In embodiments of the present disclosure, the emoji resource data from various sources may specifically include emoji resources of various themes from various sources, for example, emoji packages of themes such as Ali the fox, YOYO monkey, dramatic expression photo album of a real person like Guo Degang, etc.

Accordingly, the emotion label may be used to represent a semantic emotion that the emoji intended to convey. In embodiments of the present disclosure, a correspondence relationship between a first emoji included in the emoji resource data and an emotion label is established, that is, according to semantic emotion conveyed by each first emoji included in the emoji resource data, the emotion label corresponding to the first emoji is determined, and the correspondence relationship between the first emoji and the corresponding emotion label is established.

In embodiments of the present disclosure, the emoji resource data may be obtained in different ways, for example, emoji resources of various themes in the network (including emoji resource of customized themes and so on). Further, using chat language resource data, which means using associations between text contents and second emojis inputted by massive users in actual comments and chat processes, through emoji matching, a correlation between one of the text contents and a first emoji may be obtained. A first keyword may be extracted from the text content; and combining the first keyword, the first emoji from the emoji resource data may be classified to determine an emotion label corresponding to the first emoji, and a correspondence relationship between the emotion label and the first emoji may be established.

Accordingly, when a user publishes a comment in a community or chats with friends, the inputted chat language often contains an emoji, for example, "playing today makes me very happy :)". In this example, "playing today makes me very happy" is the text content of the current input, and ":)" is the second emoji associated with the text content of the current input. In embodiments of the present disclosure, according to the text content inputted by the user (playing today makes me very happy) and the second emoji associated with the text content (:)), the relevant text content associated with the second emoji ":)" is determined to be "happy." Meanwhile, according to the emoji resource data, the second emoji ":)" belongs to an emoji package of a certain theme, accordingly, the relevant text content associated with a first emoji ":)" in the emoji package of this theme is determined to be "happy."

Figure 2:
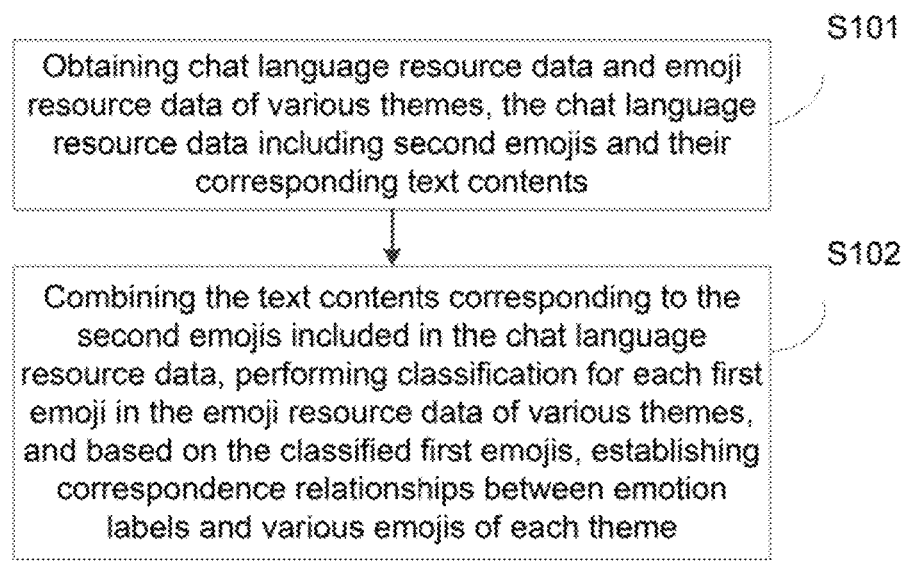
FIG. 2 illustrates a flow chart of a process for establishing correspondence relationships between emotion labels and emojis of various themes according to one embodiment of the present disclosure.

Optionally, referring to FIG. 2 which illustrates a flow chart of a process for establishing correspondence relationships between emotion labels and emojis of various themes consistent with the present disclosure, such method may include step S101 and step S102.

As shown in FIG. 2, the step S100 may include the following.

In step S101, chat language resource data and emoji resource data of various themes are obtained, and the chat language resource data may specifically include second emojis and text contents associated with the second emojis.

In embodiments of the present disclosure, the chat language resource data may be obtained from many aspects. The chat language resource data in the present disclosure may refer to emoji-containing data produced from user chatting, commenting and other processes.

For example, when entering a text, a user may input an emoji related to the entered text, such as: chat log (e.g., chat logs containing emoji inputs from QQ, Wechat and other messaging tools may be obtained, certainly anonymous encryption processing can be performed on user name and other privacy information when obtaining the chat logs), community comments (e.g., content of comments containing emoji inputs from websites like Jingdong and Dianping), social network contents (e.g., status or comments containing emoji inputs from QQ Space, Sina Weibo, Renren and so on). In embodiments of the present disclosure, through chat language resource data obtained from many sources, text contents and second emojis associated with the text contents may be collected for further analysis.

In embodiments of the present disclosure, the emoji resource data may also be obtained from various aspects, for example, emoji package resources of various themes on the internet (emoji package themes may be, for example, Ali the fox from QQ, YOYO monkey, photo album including dramatic expressions of a real person like Guo Degang, a customized emoji package added by a user through an interface for customizing emoji, such customized emoji package may be understood as a custom theme emoji package). In another example, cooperation with a third party may take place, and emoji packages of themes produced cooperatively with the third party may be directly acquired (input method developer directly work with a cartoon emoji producer and establish a procedure to get the emojis).

Optionally, after obtaining the emoji resource data, the method may further include: converting emojis in the emoji resource data to a standard format under a unified system platform. Because of compatibility issues between the originally obtained emoji resource data and various input environments, it is necessary to standardize emojis from various channels and sources, and through conversion and transcoding, the uniformity of the format and coding on a same system platform can be achieved (that is, respectively setting up different standards for mobile software platform and PC software platform).

In step S102, according to the second emoji and the text content associated with the second emoji included in the chat language resource data, classification on the first emojis in the emoji resource data are performed. Further, based on the classification result of the first emojis, correspondence relationships between emotion labels and the first emojis are established.

In embodiments of the present disclosure, the emojis included in various themed emoji resources from various sources may be referred to as first emojis consistent with embodiments of the present disclosure; while emojis included in the chat language resource data obtained from user inputs of various sources may be referred to as second emojis consistent with embodiments of the present disclosure.

In embodiments of the present disclosure, classification may be performed on first emojis included in the emoji resource data of various themes to determine an emoji category for each first emoji, thereby grouping differently-themed first emojis that belong to a same category into the same emoji category. For example, ":)" is an emoji resource belonging to an emoticon theme, a smiley face is an emoji resource belonging to a picture theme, when the classification is performed, ":)" and the smiley face may be determined to belong to a same emoji category. It should be noted that the specific method for determining an emoji category for a first emoji is described in detail in the following sub-step A13.

In addition, in embodiments of the present disclosure, emoji categories may be configured in advance, the emoji categories may include, for example, smile, laugh, sneer and so on. Under each emoji category, a corresponding second keyword may be configured in advance. It should be noted that, human emotion expressions have different intensities, accordingly, each emoji category may include one or more second keywords. For example, with regard to an emoji category "happy", the emoji category may include multiple second keywords, such as smile, laugh, laugh out loud and so on.

In embodiments of the present disclosure, according to an emoji category of a first emoji in the emoji resource data, combining a text content associated with a second emoji in the chat language resource data that matches with the first emoji, and combining the second keywords under the emoji category of the first emoji, an emotion label corresponding to the first emoji is determined. Optionally, combining the second emoji and the text content associated with the second emoji included in the chat language resource data, performing classification on every first emoji in the emoji resource data of various themes as described in step S102, may further include sub-step S1021 and sub-step S1022 as follows.

In sub-step S1021, based on the second emoji and the text content associated with the second emoji included in the chat language resource data, a first keyword corresponding to each first emoji in the emoji resource data is mined.

In embodiments of the present disclosure, the emojis included in various themed emoji resources from various sources may be referred to as first emojis consistent with embodiments of the present disclosure. Hence, the second emojis in the chat language resource data may be generally included in the first emojis of the emoji resource data. That is, in embodiments of the present disclosure, using an emoji matching method, a first emoji included in the emoji resource data that matches with a second emoji from the chat language resource data may be determined.

Meanwhile, in embodiment of the present disclosure, the second emoji and the original text content associated with the second emoji can be obtained from the chat language resource data, and text content relevant to the second emoji can be extracted from the original text content; through emoji matching, a first emoji that matches with the second emoji may be found in the emoji resource data; a correlation between the first emoji and the text content relevant to the matched second emoji is thereby established, and the relevant text content may be mined to obtain the first keyword, i.e., the first keyword corresponding to the first emoji.

Optionally, the sub-step S1021 may include sub-steps A11 and A12 as follows.

In sub-step A11, a symbol matching rule and a picture content evaluation rule may be used to extract the second emoji and the text content relevant to the second emoji from the chat language resource data.

The chat language resource data collected from a variety of sources may include a large number of text contents that are not relevant to the emojis. In embodiments of the present disclosure, the symbol matching rule and the picture content evaluation rule may be implemented to, from the second emojis and text contents included the chat language resource data, extract the second emojis and the text contents relevant to the second emojis. That is, the contents not relevant to the second emojis are deleted from the original text contents, only the text contents relevant to the second emojis are retained.

For example, a symbol matching rule may be used on an emoticon such as ":)" to obtain text content (such as chat content, comment content and so on) appeared before or after the emoticon, and a certain length of text content appeared before or after the emoticon may be used as the text content relevant to this emoticon. Using "playing today makes me very happy :)" as an example, the text content appeared before the emoticon is "very happy", so "very happy" may be determined as the text content relevant to the emoticon ":)".

As for pictures, a picture content evaluation rule may be implemented to determine whether or not a picture is an emoji picture, and if yes, the text content before and/or after the picture is extracted. The picture content evaluation rule may adopt common picture content evaluation methods, and the embodiments of the present disclosure do not limit such methods. For example, a large quantity of samples of emoji pictures of various categories may be collected, and a pixel matrix training (any training method may be implemented, embodiments of the present disclosure do not limit such methods) may be performed to obtain an emoji picture recognition model. For an emoji picture in the chat language resource data, a pixel matrix may be obtained from the emoji picture, the pixel matrix is then entered to the emoji picture recognition model for identification.

In sub-step A12, the first emoji in the emoji resource data is matched with second emojis extracted from the chat language resource data, and when a successfully-matched second emoji is found, the first emoji is correlated with the text content relevant to the second emoji matched with the first emoji, and a first keyword corresponding to the first emoji is mined and extracted from the text content relevant to the second emoji matched with the first emoji.

Specifically, the step may include matching first emojis in the emoji resource data with a second emoji extracted from the chat language resource data. Namely, in embodiments of the present disclosure, after extracting the second emoji and the text content relevant to the second emoji, the second emoji may be matched with the first emojis in the emoji resource data of various themes, the matching may be a one-to-one matching, and may also be a fuzzy match (that is, pictures may also be matched when the similarity is above certain threshold).

Further, for the successfully-matched first emoji, the correlation between the first emoji and the text content relevant to the second emoji that matched with the first emoji may be established, and the first keyword is extracted from the text content.

For example, in the sub-step A11, the text content relevant to the second emoji ":)" may be extracted and obtained from the chat language resource data, which is "very happy". Further, after matching, it is determined that a first emoji ":)" from a certain emoji package in the emoji resource data is matched with the second emoji ":)" extracted in the sub-step A11, a correlation may be established between the first emoji ":)" and the text content "very happy". In addition, the first keyword is extracted from the text content "very happy", for example, the first keyword may be "happy", which is used as the first keyword corresponding to the first emoji ":)".

In sub-step S1022, according to the first keyword corresponding to the first emoji mined and obtained in step S1021 and the second keyword under each emoji category in the emoji resource data, an emoji category of the first emoji may be obtained.

In embodiments of the present disclosure, the aforementioned emoji categories may be preset according to various emoji labels from the emoji packages of various themes. The process of obtaining the second keyword may include: by manual annotation, determining all iconic and detailed labels (including smile, laugh out loud, snicker, and so on) for the emoji category (e.g., category happy), and using these labels as the second keywords for corresponding emoji categories. Further, combining the first keyword corresponding to the first emoji and the preset second keyword under each of the emoji categories, a prediction algorithm may be used to determine an emoji category for the first emoji, and determine an emotion label corresponding to the first emoji.

Optionally, the sub-step S1022 may include sub-steps A13 and A14 as follows.

In sub-step A13, with respect to the first emoji that successfully matched in sub-step A12, based on the second keywords under each of the emoji categories in the emoji resource data, combining the first keyword corresponding to the first emoji, an emotion classification prediction is performed to determine the emoji category to which the first emoji belongs.

In embodiments of the present disclosure, a common method for emotion analysis classification may be used, a prediction is performed based on the first keyword corresponding to the first emoji, and a classification is performed for the first emoji, in this way, an emoji category for each first emoji may be determined.

The general principle of the emotion analysis classification method includes: training a classifier by using the annotated samples (e.g., the second emoji or the other collected emoji samples) of each emoji category, such as using a Naive Bayes (NB) method to construct the classifier; and according to a classification feature of each to-be-classified object (in embodiments of the present disclosure, the first emoji is a to-be-classified object, and the first keyword corresponding to the first emoji is a classification feature), using the classifier to perform recognition. In embodiments of the present disclosure, an emotion scale may be set for each emoji category respectively, for example, the score of big laugh is +5, the score of smile is +4, the score of snicker is +3 and so on, and the emotion scale is corresponded to the classification result of the classifier.

In sub-step A14, with regard to a first emoji that does not have a successful match in step A12, the first keyword corresponding to the first emoji is empty, then based on the second keyword under each emoji category in the emoji resource data, the emoji category of the first emoji is determined.

For the first emoji in the emoji resource data that does not have a successful match, that is, no text content is available to mine a first keyword for the first emoji, in embodiments of the present disclosure, the emoji category of the first emoji that does not have a successful match may be determined by manual annotation.

After the classification is completed, based on the second keyword under the emoji category of the first emoji and the extracted first keyword corresponding to the first emoji, an emotion label of the first emoji is determined.

Optionally, based on the classification result of the first emoji, combining the second emoji and the text content associated with the second emoji included in the chat language resource data, constructing a correspondence relationship between the emotion label and the first emoji of each theme as described in step S102, may further include the following sub-step S1023.

In sub-step S1023, a second keyword under the emoji category of the first emoji is obtained, the first keyword corresponding to the first emoji and the second keyword are combined as the emotion label of the first emoji, thereby obtaining the correspondence relationship between the emotion label and the first emoji.

In embodiments of the present disclosure, the first keyword corresponding to each first emoji obtained through analysis and the second keyword under the emoji category of the first emoji may be combined into the emotion label of the first emoji, that is, the correspondence relationship between the emotion label and a first emoji in each theme may be obtained.

In other embodiments, after determining the emotion label of the first emoji, the method may further include step S103.

In step S103, according to a synonym of the emotion label, and the emojis in the emoji resource data that corresponding to the synonym, a correspondence relationship between the emotion label and the first emoji of each theme is established.

In a practical implementation, the synonym of the emotion label may be determined; the emoji corresponding to the synonym in the emoji resource data is obtained; and combining the emoji corresponding to the synonym, a correspondence relationship between the emotion label and the first emojis may be established. For example, multiple synonyms of the emotion label may be found using a preset dictionary, and each synonym is searched in the emoji packages of various themes, and emojis corresponding to the respective synonyms are obtained, and the correspondence relationship between the emotion label and the emojis on various themes are obtained.

For example, a basic emotion label may be pre-selected for each emoji category. Further, with regard to the basic emotion label of each emoji category, synonyms for the basic emotion label may be obtained by querying a preset dictionary. Afterwards, based on each synonym, corresponding emojis from emoji resources of various themes may be obtained, that is, the basic emotion label may be corresponded with emojis of different synonyms.

Certainly, in the present disclosure, the correspondence relationship between the emotion label and the first emoji may also be manually configured, that is, an emotion label may be selected, and then be manually corresponded with one emoji in each theme.

Optionally, prior to merging the first keyword corresponding to the first emoji and the second keyword into the emotion label of the first emoji, the method may further include: based on usage frequency of the first keywords in the chat language resource data, filtering the first keywords, and combining a filtered first keyword having high usage frequency and the second keyword into an emotion label of the first emoji.

In practice, a first keyword having a usage frequency greater than a preset threshold may be retained and then combined with the second keyword to generate the emotion label of the first emoji. Certainly, for the first emoji without a corresponding first keyword, the second keyword is directly used as the emotion label of the first emoji.

Optionally, the method in embodiments of the present disclosure may further include: optimizing a second keyword under each emoji category in the emoji resource data. Specifically, the first keywords corresponding to all first emojis of each emoji category in the emoji resource data and the second keyword under the emoji category may be aggregated, and each keyword is searched in the chat language resource data to obtain a usage frequency, the keyword having a frequency greater than the preset threshold may be considered as the optimized second keyword. This step optimizes the keywords included in each emoji category to make them more accurate.

Certainly, in embodiments of the present disclosure, the emotion labels of the first emojis may be aggregated, and an index may be constructed based on the aggregated emotion labels; the index is used to index the first emoji corresponding to each emotion label, the index may be inverted.

Below is a practical example describing the above process.

1, From the default emoji set on Weibo, we know that the symbol "V5" is an emoji.

2, Microblogs containing emoji pictures may be obtained from Sina Weibo. For example, microblogs posted by netizens to appraise Li Na for winning the champion of Australian Open, as shown in FIG. 3.

3, A data interface provided by Weibo may be used to obtain microblog contents of similar types, using records in the original emoji resource data, a text part of the microblog "Li Na is really great! Feeling proud!" and an emoji "V5" may be recognized, as well as a text part of the microblog posted by Li Bingbing "you make our Li family proud . . . " and the emoji "V5". Thus, both texts may be used as descriptive texts for the emoji "V5". Adjectives may be extracted from the texts, it may be found that "proud" appears two times, "great" appears one time. The word having a high frequency may be extracted, and it may be deduced that "proud" is the word that expresses the core emotion of all similar microblogs. Thus, the correspondence between the word "proud" and the emoji "V5" may be established and stored in an emoji-label relation library. Similarly, aggregating more microblog contents containing the emoji "V5" may obtain a set of descriptive keywords of the emoji V5. The keywords for V5 may be used as its emotion label, that is, the correspondence relationship between the emotion label and the emoji is established.

Further, in embodiments of the present disclosure, an emotion classification model can be constructed. The emotion classification model may be constructed by analyzing the collected chat language resource data and the emoji resource data of various themes. That is, emojis in the emoji resource data are classified using the chat language resource data, and then the emotion classification model is trained according to the classification results. Optionally, referring to FIG. 4, in embodiments of the present disclosure, the emotion classification model may be constructed according to step S104 to step S106.

In step S104, with regard to a first emoji of each theme, according to a matching relationship between the first emoji and a second emoji, text content correlated with the first emoji may be obtained from the chat language resource data;

As described previously, in embodiments of the present disclosure, the chat language resource data and the emoji resource data of various themes may be obtained from a plurality of aspects and used for constructing the correspondence relationships between an emotion label and first emojis of various themes. When constructing the emotion classification model, the previously established correspondence relationships between the emotion label and the emojis of various themes may also be used to obtain training samples.

In this step, according to second emojis and their relevant text contents included in the chat language resource data, the first emoji is matched with the second emojis, when a successful match is found for the first emoji, the text content correlated with the first emoji may be obtained accordingly.

In embodiments of the present disclosure, the first emoji whose correspondence relationship with an emotion label has already established may be targeted, and a text content may be found to match such first emoji. Certainly, in embodiments of the present disclosure, the correspondence relationship between the previously-obtained emotion label and the first emojis may also be manually sorted and labeled, the subdivision label of all emotions may be determined, and an emoji sample of each emotion label may be determined, such as happy, laugh out loud, smug and so on. The emotion model may then be constructed based on the correspondence relationship between the emotion label and the emoji according to step S104 through step S106.

Optionally, step S104 may include sub-steps A15 and A16 as follows.

In sub-step A15, a symbol matching rule and a picture content evaluation rule may be used to extract a second emoji and a text content relevant to the second emoji from the chat language resource data.

In sub-step A16, in the emoji resource data of various themes, the first emojis are respectively matched with the extracted second emojis, when successful matches are found, the matched first emojis are correlated with the text contents relevant to the matched second emojis respectively, thereby establishing a correspondence relationship between the text content and the emotion label of the first emoji.

In S105, natural language text features are extracted from the text content correlated with the first emoji.

In embodiments of the present disclosure, the natural language text features may specifically include n-gram model, part-of-speech feature, mixed-word feature, negative word feature, emotion modifier feature, etc.

The n-gram model may use preceding n−1 words that have already appeared, to predict the nth word. The part-of-speech feature may be a word type of a segmented word, such as noun, verb, adjective and so on. The mixed word feature includes a combination of words, or a combination of consecutive words. The negative word feature describes a phrase with a negative prefix. The emotion modifier feature refers to the influence, calculated and labeled through statistical means, on emotion expression by an adverb and an adjective in the language. An emotion transfer feature refers to different emotions expressed by a same sentence in different contexts. For example, with regard to the sentence "that is sick!", if the context of the chat has a positive emotional attitude, then the meaning of this phrase may still likely to express a positive attitude, if the context has a negative emotion, this phrase is more likely to be negative. Thus, the frequency of positive and negative attitudes expressed by this sentence may be labeled and counted respectively for both positive and negative context occasions, the probability of the sentence belonging to an emotional attitude in a specific context may be calculated accordingly.

In step S106, according to the emotion label and the text features corresponding to the first emoji, the emotion classification model is trained.

After the text features are obtained in step S105, combining the corresponding emotion label, using the text features as inputs of the training sample, using the emotion label as an output class of the training sample, the emotion classification model is trained. In embodiments of the present disclosure, naive Bayes, k-Nearest Neighbor (k-NN), maximum entropy, support vector machine and other classical machine learning methods may be used to train the text classifiers for emoji categories, the emotion classification model may be generated accordingly.

Using a simple support vector machine as an example, provided that a function is $$h_\theta(x) = g(\theta^T x) = \frac{1}{1 + e^{-\theta^T x}},$$

where $\theta^T x = \theta_0 + \theta_1 x_1 + \theta_2 x_2 + \ldots + \theta_n x_n$, then $\theta_0$ is substituted by b, $\theta_1 x_1 + \theta_2 x_2 + \ldots + \theta_n x_n$ is substituted by $w_1 x_1 + w_2 x_2 + \ldots + w_n x_n$, which is $w^T x$. Further, the interval for each sample function may be defined as $\hat{y}^{(i)} = y^{(i)}(w^T x^{(i)} + b)$, where $(x^{(i)}, y^{(i)})$ denotes a training sample, in embodiments of the present disclosure, x denotes inputted text features, and y denotes an emotion label.

Using the emotion labels and the various text features corresponding to the first emoji, training samples may be constructed, and the emotion classification model may be trained. namely, the parameters $w^T$ and b in the previous equation may be trained and to be used later. When the support vector machine is used, one classifier may correspond to one emoji category. The present disclosure can provide a plurality of classifiers constructed for different emoji categories, and the whole emotion classification model may be constructed using the plurality of classifiers.

Figure 5:
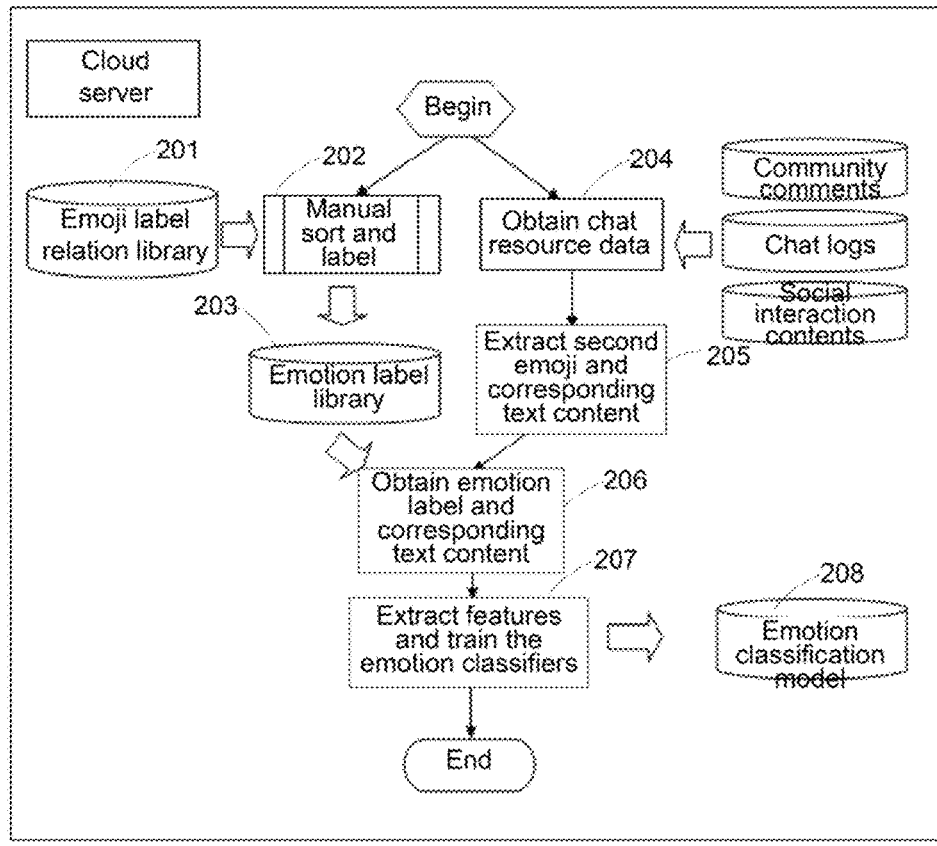
FIG. 5 illustrates a flow chart of a process for constructing an emotion classification model according to one embodiment of the present disclosure.

Referring to FIG. 5, the emotion classification model is explained as follows.

In embodiments of the present disclosure, an emoji label relation library 201 may be configured to store correspondence relationships between preset emoji categories and first emojis of various themes, and the emotion label library 203 may be configured to store correspondence relationships between the emotion labels and the first emojis on various themes. The emotion classification model 208 has the capability to classify a plurality of emotion labels.

In 202 as shown in FIG. 5, first, the emoji categories and the first emojis of various themes in the emoji label relation library 201 are manually sorted and labeled, and then the sorted and labeled results are stored in the emotion label library 203. For example, using the manual annotation method, for each emoji category (e.g., category compliment), all iconic and detailed labels (including proud, great, not easy, and so on) are determined, these labels are used as the second keywords under this emoji category, and the relationship between the second keyword and the first emoji is stored in the emotion label library 203.

In 204 as shown in FIG. 5, chat language resource data from various sources may be obtained. Further in 205 as shown in FIG. 5, the second emojis and their associated text contents are extracted from the chat language resource data. For example, microblogs containing emojis may be obtained from Sina Weibo, such as a microblog that appraises Li Na for winning the championship of Australian Open posted by a netizen. A data interface provided by Weibo may be used to obtain microblog contents of similar types, using the content records from the original emoji library, the text part of the microblog "Li Na is really great! Feeling proud!" may be recognized. Certainly the chat language resource data may be obtained from other data sources. Certainly the chat language resource data used for establishing the correspondence relationship between the emotion label and the first emojis of the emoji resource data may be directly used.

In 206 as shown in FIG. 5, a first emoji in the emotion label library 203 may be matched with a second emoji extracted from the chat language resource data, so that an emotion label and text contents corresponding to the first emoji may be obtained. The process of obtaining the emotion label corresponding to the first emoji may include: after a successful match is found, correlating the first emoji and the text content relevant to the second emoji that matched with the first emoji, and mining a first keyword corresponding to the first emoji from the text content relevant to the second emoji that matched with the first emoji; according to the mined first keyword corresponding to the first emoji and second keywords under each preset emoji category, obtaining the emoji category of the first emoji; obtaining the second keyword under the emoji category of the first emoji that corresponds to the first emoji, combining the first keyword corresponding to the first emoji and the second keyword to generate an emotion label of the first emoji, thereby obtaining correspondence relationship between the first emoji from the emoji resource data and the emotion label; meanwhile the obtained correspondence relationship between the emotion label and the first emoji from the emoji resource data may be stored in the emotion label library 203.

In 207 as shown in FIG. 5, the text contents may be segmented and corresponding text features may be extracted. For example, n-gram text features such as "Li Na", "really", "great", "not easy", "easy", "winning the championship", and "Li Na winning the championship", and negative word feature such as "really not" and other features may be obtained. Since these features are associated with emotion label through emojis "V5" and "thumbs up", the text features and the emoji category corresponding to "compliment" and other emotion label may together construct a training sample, and naive Bayes, k-Nearest Neighbor (k-NN), maximum entropy, support vector machine and other classical machine learning methods may be used to train emotion classifiers, the emotion classification model 208 may be generated accordingly.

It will be appreciated that, in embodiments of the present disclosure, the correspondence relationships between the emotion labels in the emotion analysis model and the first emojis are based on a variety of sources of chat language resource data and emoji resource data, and the chat language resource data and the emoji resource data may be changed as the time changes. Hence, in embodiments of the present disclosure, the chat language resource data and the emoji resource data may be updated continuously, and the relationships between the emotion analysis model and the first emoji, between the emotion label and the first emoji may be repeatedly optimized through the aforementioned steps.

Optionally, in embodiments of the present disclosure, the establishment of the correspondence relationship between the emotion analysis model and the emojis of various themes, between the emotion labels and the emojis of various themes may be executed in the cloud server.

After establishing the correspondence relationship between the emotion classification model and emojis of various themes, between the emotion labels and the emojis of various themes, the semantic understanding based emoji input method of the present invention may be executed. Referring to FIG. 1, FIG. 1 illustrates a flow chart of a semantic understanding based emoji input method consistent with the present disclosure; The method shown in FIG. 1 includes the following steps 110 through 150.

In step 110, text content according to an input sequence is obtained.

When a user launches the Input method and presses characters on the keyboard, the input method may obtain an input sequence (that is, the sequence of characters), and then the input method may analyze and match the input sequence to obtain Chinese character candidate options according to the input sequence. In embodiments of the present disclosure, text content of each candidate option may be obtained. In other embodiments, a text according to an input sequence that has just been entered on the screen may also be considered as the text content according to the input sequence. In embodiments of the present disclosure, optionally, the text content of the first candidate option is used. Certainly, the text content may be obtained from the backstage, that is, after the input method identifies the converted phrase and before the identified phrase is shown in the input method interface, the phrase may be obtained.

Figure 6:
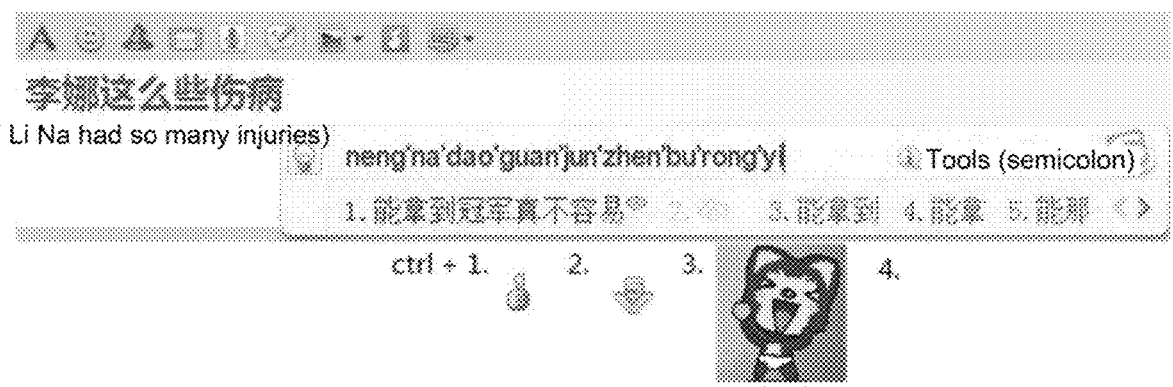
FIG. 6 illustrates an example of displaying emojis according to one embodiment of the present disclosure.

For example, referring to FIG. 6, the text content obtained according to user input is "at this age, Li Na had so many injuries, it is really not easy to get the champion."

In step 120, word segmentation is performed on the text content, and based on the word segmentation result, text features may be extracted.

After the text content is obtained, natural language text features may be extracted, including: n-gram model, part-of-speech feature, mixed-word feature, negative word feature, emotion modifier feature, etc. The principle is similar as the process of extracting text features when training the emotion classification model.

The input method obtains information of the entire inputted sentence, the cloud server performs word segmentation and obtains segmented word including "Li Na", "so", . . . , "get", "champion", "really", "not", and "easy" and so on, and a negative word "really not". A three-gram feature may be further extracted and obtain a text feature: "really not easy".

Step 130, an input vector is constructed using the text features, classification is performed using an emotion classification model, so that an emotion label of the text content may be determined.

The emotion classification model constructed in previous steps is an emotion classification model having determined model parameters, thus when inputting the input vector corresponding to the text features to the emotion classification model for calculation, a corresponding classification result may be obtained, and an emotion label of the text contents may further be determined. For example, referring to FIG. 6, the text features are inputted to the emotion classification model, the obtained emotion label that represents the user expression is "compliment".

Step 140, first emojis corresponding to the emotion label may be obtained from the emoji resource data.

In a practical implementation, according to the aforementioned correspondence relationship between the emotion label and the first emoji from the emoji resource data, the first emoji corresponding to the emotion label may be obtained from the emoji resource data. In a practical implementation, the emoji resource data may be stored in the input method client or the server in the form of emoji lexicon. For example, according to "compliment", the emoji lexicon may be searched and the corresponding first emojis of various themes may be retrieved, as shown in FIG. 6.

In step 150, after sorting the obtained first emojis, the sorted emojis are displayed as candidate options in the client.

Referring to FIG. 6, it illustrates an example of emoji presentation according to one embodiment of the present disclosure. After obtaining the first candidate on the user screen "it is really not easy to get the champion", the entire sentence of the text content entered by the user may be obtained "at this age, Li Na had so many injuries, it is really not easy to get the champion." By executing the aforementioned steps 120 through 150, an emotion label "compliment" associated with the text content, and four emojis corresponding to the "compliment" emotion label may be obtained, the four emojis can all express the semantic meaning "compliment," and are suitable for current context. FIG. 6 also illustrates an example of presenting the four emojis as sorted candidate options, which can facilitate the user to select a desired emoji to enter the input field through a shortcut key.

Optionally, the step of sorting multiple emoji candidate options may specifically include sub-steps S151.

In sub-step S151, for the first emojis included in each emoji category, the corresponding emoji candidates may be sorted according to the number of times the first emojis appear in the chat language resource data and/or the personalized information of the user.

In embodiments of the present disclosure, multiple first emoji candidates may be corresponding to a same word or emoticon. Accordingly, in the present disclosure, utilizing the usage frequency of each first emoji in the chat language resource data, the emoji candidates may be sorted (through tallying the second emojis matched with the first emojis); or utilizing personalized information of the user (including sex and hobbies and so on), the emoji candidates may be sorted.

That is, in the present disclosure, sorting types may be preset for the first emojis themselves, such sorting types are related to user preferences. For example, the sorting types may be preset according to sex (sorting types may include: frequently used by young men, frequently used by young women, frequently used by middle-aged men, frequently used by middle-aged women and so on). During sorting process, personalized information of the user may be obtained, comparison analysis may be performed on the personalized information and the preset sorting types, the emoji whose sorting type having a higher similarity with the personalized information may be ranked in the front.

In a practical implementation, the sorted emoji candidates may be displayed at proper positions in the input method interface, for the user to select or see more emojis by flipping pages. In embodiments of the present disclosure, the detailed display location of the emoji candidate is not limited.

In embodiments of the present disclosure, the chat language resource data generated by massive users may be used as the data source for analysis, all sorts of emoji resource data (including emoji resource data on various themes) are classified, correspondence relationships between emotion labels and various emojis on each theme may be established. In subsequent process of using the input method, users may obtain corresponding emojis of different themes and different styles as candidates. In the present disclosure, the emojis have a wide scope and covers a great range, which provides the user with richer and higher volume of emojis. Further, emojis are employed in the lexicon of the input method, the user input may be directly analyzed and according to a correspondence relationship between an emotion label obtained by semantic understanding and emojis from each theme, the emojis may be retrieved as candidates to be displayed in the input method, and directly provided to the user for selection. The aforementioned procedure can, through precisely matching emoji input requirements of users, enhance emoji usage efficiency and reduce the time cost of users spent on searching for emojis during emoji input process. This method does no need to consider the production cost and content of the emoji packages, producers may create freely, reducing constrains on development and widespread of chat emojis. In the present disclosure, various emojis are collectively classified, the user does not need to download installation packages from all over the place, thereby reducing the time cost for the user to search for the installation packages. Since the emojis in embodiments of the present disclosure are candidate options in the input method, when switching input scenarios such as the chat platforms, the user does not need to re-download or update emoji packages, and also the problem of transplanting information about frequently-used emoji collections can be avoided. In addition, the present disclosure provides semantic understanding of the user inputs, and solves the problem of little coverage of emotion labels on emotions expressed by natural language of users. In the present disclosure, structural correspondences are established to various emojis in units of emotion label, when a user inputs a character sequence, semantic analysis is performed on the first candidate text or just-entered text, corresponding emotion label may be obtained, and emojis on various themes corresponding to the emotion label may be called and loaded as candidate options. In this way, the corresponding emojis of various themes that expressing same meanings may be recommended as candidates, thereby precisely matching current user input and enriching the user input content.

Embodiment 2

Figure 7:
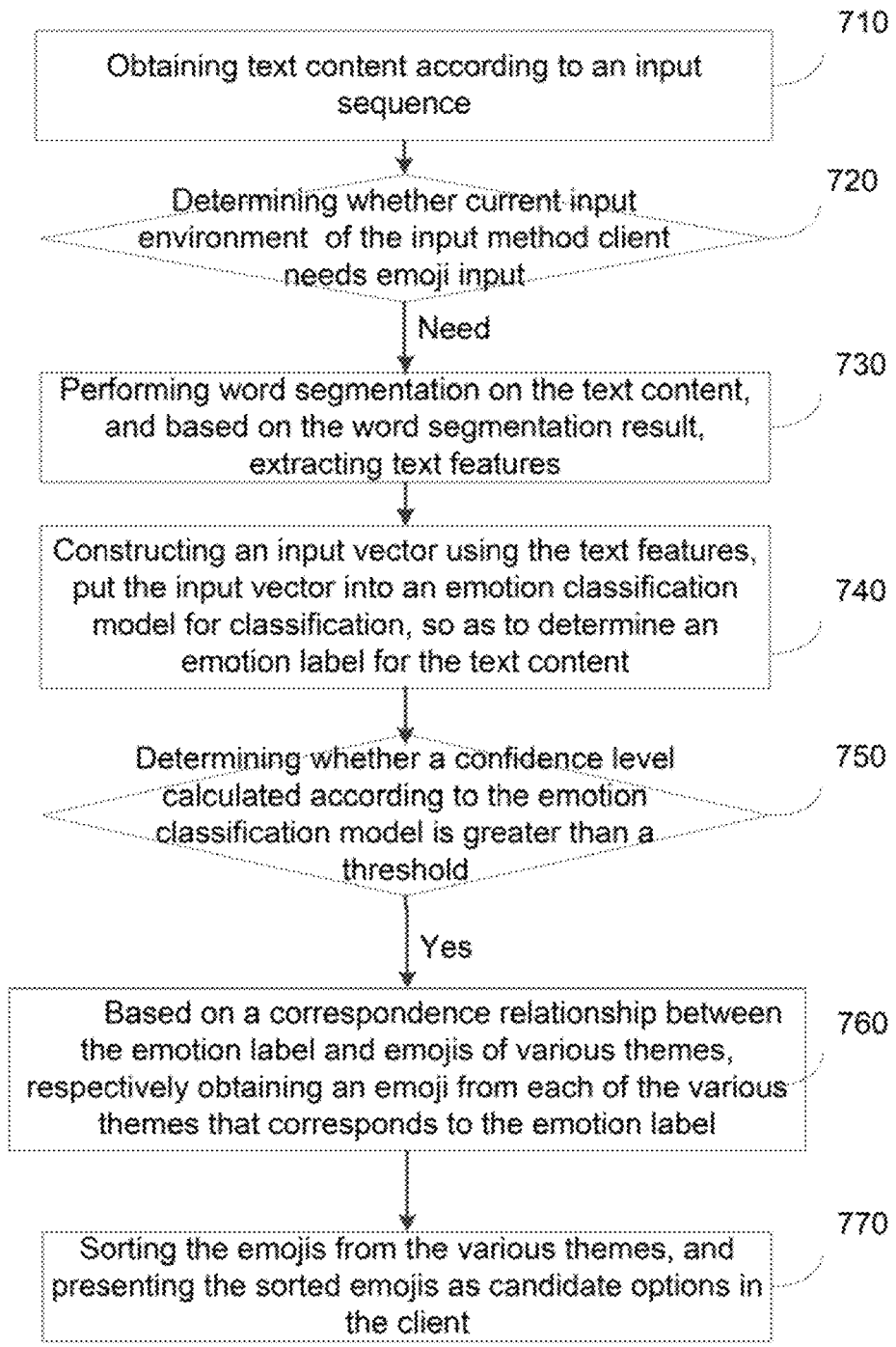
FIG. 7 illustrates a flow chart of a semantic understanding based emoji input method according to one embodiment of the present disclosure.

Referring to FIG. 7, which illustrates a flow chart of a semantic understanding based emoji input method according to the present disclosure, the method may include the following.

In step 710, text content according to an input sequence is obtained.

In step 720, whether the current input environment of the input method client needs emoji input are determined. When the emoji input is needed, the process goes to step 730. When the emoji input is not needed, the process goes to traditional input mode.

That is, the input method may identify the current user input environment. If it is a chat environment or a webpage input environment, it is more likely that it is an environment that needs emoji input, step 730 is then executed. When there is no need, candidate texts are directly generated from the text content and presented to the user.

In step 730, word segmentation is performed on the text content, and based on the word segmentation result, text features may be extracted.

In step 740, an input vector is constructed using the text features, classification is performed using an emotion classification model, so that an emotion label of the text content may be determined.

In step 750, a confidence level of the emotion label for the text content is calculated according to the emotion classification model, and whether the confidence level is greater than a threshold is determined. When the confidence level is greater than the threshold, the process moves to step 730; when the confidence level is not greater than the threshold, the process goes to traditional input mode.

When multiple emotion classifier in the emotion classification model calculates, one value may be obtained, such as the value of $h_\theta(x)$ in previously described support vector machine. If the value is greater than 0.8, it is considered that the confidence level of the corresponding emotion classification is high, and follow-up procedures may be carried out. In an optional embodiment of the present disclosure, emotion intensity and quality may be identified in this step, that is, not until the emotion intensity and quality meet certain requirements, the follow-up procedure may be carried out.

In step 760, a first emoji corresponding to the emotion label may be obtained from emoji resource data.

According to the chat language resource data and the emoji resource data of various themes, the correspondence relationships between emotion labels and emojis of various themes are established; or according to synonyms of the emotion labels and emojis of various themes corresponding to such synonyms, the correspondence relationships between the emotion labels and the emojis of various themes are established.

In step 770, after sorting the obtained first emojis, the sorted emojis are displayed as candidate options in the client.

In embodiments of the present disclosure, the correlation between the emotion label and the emojis of various themes, and the emotion classification model may be established in advance. The principles of which are similar to that described in Embodiment 1. Certainly, embodiments of the present disclosure may adopt other similar steps as those of Embodiment 1, the principles of which are described Embodiment 1 and will not be described in detail.

Embodiment 3

Figure 8:
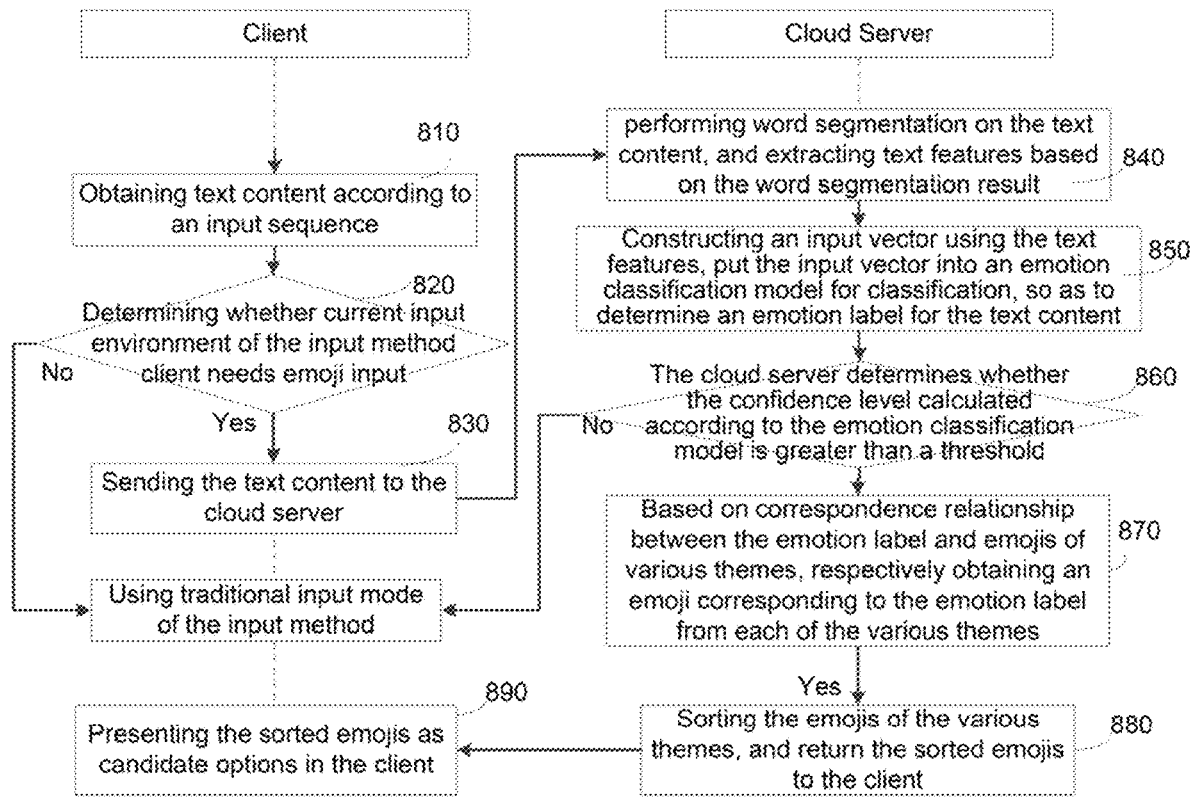
FIG. 8 illustrates a flow chart of a semantic understanding based emoji input method according to one embodiment of the present disclosure.

Referring to FIG. 8, which illustrates a flow chart of a semantic understanding based emoji input method according to the present disclosure, the method may include the following.

In step 810, text content according to an input sequence is obtained at the client side.

In step 820, whether the current input environment of the input method client needs emoji input are determined. When the emoji input is needed, the process goes to step 830. When the emoji input is not needed, the input method may enter a traditional input mode.

In step 830, the client sends the text content to the cloud server;

In step 840, the cloud server performs word segmentation on the text content, and based on the word segmentation result, extracts text features.

In step 850, the cloud server constructs an input vector using the text features, performs classification using an emotion classification model to determine an emotion label of the text content.

In step 860, the cloud server calculates a confidence level of the emotion label for the text content, and according to the emotion classification model, determines whether the confidence level is greater than a threshold. When the confidence level is greater than the threshold, the process moves to step 870; when the confidence level is not greater than the threshold, the cloud server informs the client to enter traditional input mode.

In step 870, the cloud server obtains first emojis corresponding to the emotion label from the emoji resource data.

In step 880, after sorting the obtained first emojis, the cloud server returns sorted emojis to the client.

In step 890, the client presents the sorted emojis as candidate options in the client.

Certainly, in embodiments of the present disclosure, depending on the circumstances, certain steps may be processed on the cloud server, without necessarily being limited to the description of the process described above. The correspondence relationship between the emotion label and the emojis of various themes may be established on the cloud server, as well as the emotion classification model. In embodiments of the present disclosure, a large number of steps that require calculations are executed by the cloud server, which reduces client-side operations and reduces the occupancy of the client resource.

Embodiment 4

Figure 9:
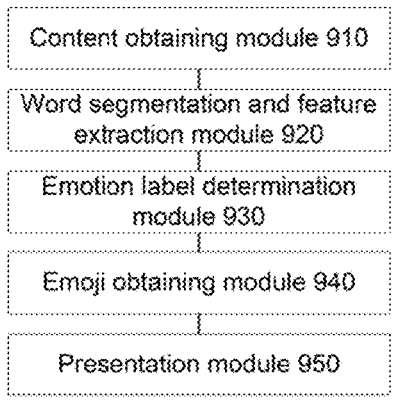
FIG. 9 illustrates a structural diagram of a semantic understanding based emoji input device according to one embodiment of the present disclosure.

Referring to FIG. 9, which illustrates a structural diagram of a semantic understanding based emoji input device according to the present disclosure, the device including:

a content obtaining module 910, configured to obtain a text content according to an input sequence;

a word segmentation and feature extraction module 920, configured to perform word segmentation on the text content, and extract text features based on the word segmentation result;

an emotion label determination module 930, configured to construct an input vector using the text features, perform classification using an emotion classification model to determine an emotion label of the text content;

an emoji obtaining module 940, configured to obtain, from the emoji resource data, a first emoji corresponding to the emotion label; and a presentation module 950, configured to, after sorting the obtained first emoji, display the sorted emoji as a candidate option in the client.

Optionally, the presentation module 950 further includes:

a sorting module, configured to, according to a number of times the first emoji appears in the chat language resource data and/or the personalized information of the user, sort the candidate option corresponding to the first emoji.

Optionally, the emoji input device may further include a relationship establishment module, configured to establish a correspondence relationship between the emotion label and the first emoji according to the chat language resource data and the emoji resource data.

In one optional embodiment of the present disclosure, the relationship establishment module may further include:

a resource obtaining module configured to obtain the chat language resource data and the emoji resource data, wherein the chat language resource data includes a second emoji and a text content associated with the second emoji; and a first establishment module configured to, according to the second emoji and the text content associated with the second emoji included in the chat language resource data, perform classification on the first emoji in the emoji resource data; and based on the classification result of the first emoji, establish a correspondence relationship between the emotion label and the first emoji.

Optionally, the first establishment module may further include:

a keyword mining module, configured to, based on the second emoji and the text content associated with the second emoji included in the chat language resource data, mine a first keyword corresponding to each first emoji in the emoji resource data; and a classification module, configured to determine an emoji category that the first emoji belongs to, according to the first keyword corresponding to the first emoji and preset second keywords under each emoji category.

Optionally, the keyword mining module may further include:

a first content extraction module, configured to use a symbol matching rule and a picture content evaluation rule to extract the second emoji and the text content relevant to the second emoji from the chat language resource data;

a matching module, configured to search, in the emoji resource data, a first emoji that matches with the second emoji;

a correlation module, configured to correlate the first emoji with the text content relevant to the second emoji; and a mining module, configured to mine, from the relevant text content, a first keyword that corresponds to the first emoji.

Optionally, the classification module may further include:

a first classification module, configured to, for a successfully-matched first emoji, based on the second keyword under each emoji category in the emoji resource data, combining the first keyword corresponding to the first emoji, perform an emotion classification prediction on the first keyword corresponding to the first emoji, and determine an emoji category for the first emoji; and a second classification module, configured to, for a first emoji that does not have a successful match and whose corresponding first keyword corresponding is empty, based on the second keyword under each emoji category in the emoji resource data, determine an emoji category for the first emoji.

Optionally, the first establishment module may further include:

a combination module, configured to, combine the first keyword corresponding to the first emoji and the second keyword under the emoji category of the first emoji into the emotion label of the first emoji; and a second establishment module, configured to establish a correspondence relationship between the emotion label and the first emoji.

In one optional embodiment of the present disclosure, the device may further include:

a determination module, configured to, after the emotion label of the first emoji is determined, and before the correspondence relationship between the emotion label and the first emoji is established, determine a synonym of the emotion label;

an emoji obtaining module, configured to obtain, from the emoji resource data, an emoji corresponding to the synonym; and a third establishment module, configured to, integrating the emoji corresponding to the synonym, establish a correspondence relationship between the emotion label and the first emoji.

Optionally, the device may further include an emotion classification model construction module. The emotion classification model construction module may further include:

a second content extraction module, configured to, according to a matching relationship between the first emoji and the second emoji, obtain, from the chat language resource data, text content correlated with the first emoji;

a text feature extraction module, configured to extract natural language text features from the text content correlated with the first emoji; and a model training module, configured to, generate a training sample according to the emotion label and the text features corresponding to the first emoji, and train the emotion classification model.

Embodiment 5

Figure 10:
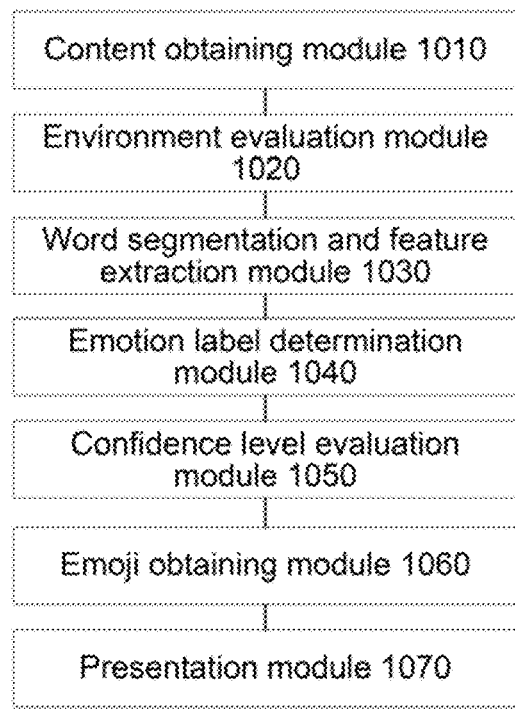
FIG. 10 illustrates a structural diagram of a semantic understanding based emoji input device according to one embodiment of the present disclosure.

Referring to FIG. 10, which illustrates a structural diagram of a semantic understanding based emoji input device according to the present disclosure, the device including:

a content obtaining module 1010, configured to obtain a text content according to an input sequence;

an environment evaluation module 1020, configured to evaluate whether a current input environment of the input method client needs emoji input; when the emoji input is needed, call the word segmentation and feature extraction module 1030; and when the emoji input is not needed, call the traditional input mode module;

a word segmentation and feature extraction module 1030, configured to perform word segmentation on the text content, and extract text features based on the word segmentation result;

an emotion label determination module 1040, configured to construct an input vector using the text features, perform classification using an emotion classification model to determine an emotion label for the text content;

a confidence level evaluation module 1050, configured to, after the emotion label of the text content are determined by the emotion classification model, calculate a confidence level of the text content belonging to the emotion label according to the emotion classification model, and evaluate whether to call the emoji obtaining module 1060;

when the confidence level is greater than a threshold, call the emoji obtaining module 1060; otherwise, call the traditional input mode module;

an emoji obtaining module 1060, configured to obtain, from the emoji resource data, first emojis corresponding to the emotion label; and a presentation module 1070, configured to, after sorting the obtained first emojis, display the sorted emojis as candidate options in the client.

Embodiment 6

Figure 11:
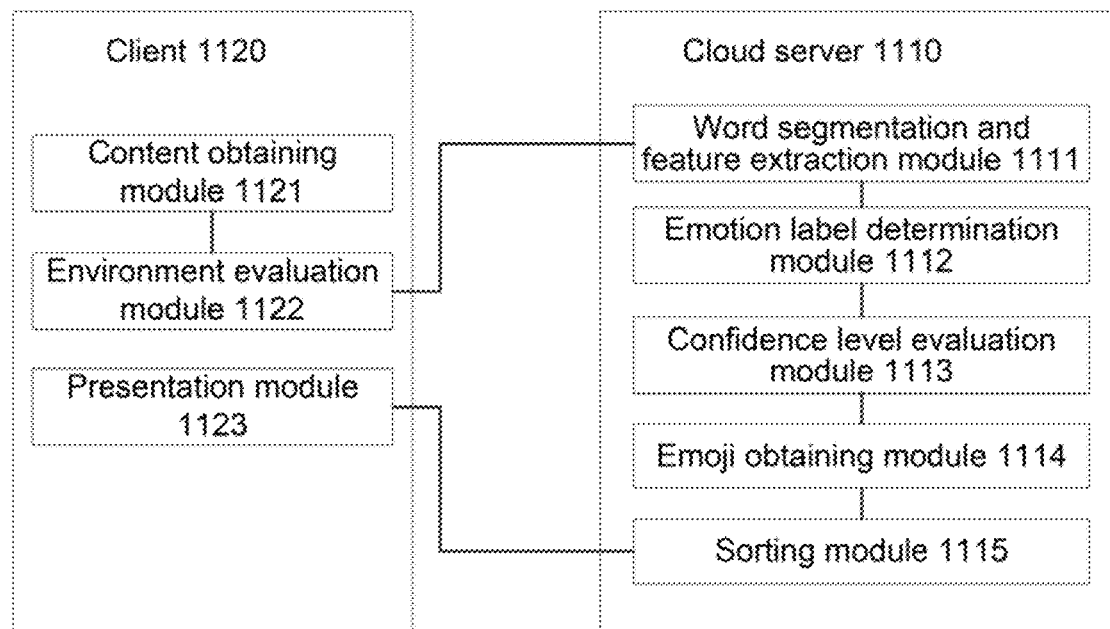
FIG. 11 illustrates a structural diagram of a semantic understanding based emoji input system according to one embodiment of the present disclosure.

Referring to FIG. 11, which illustrates a structural diagram of a semantic understanding based emoji input system consistent with embodiments of the present disclosure; the system including:

a cloud server 1110 and a client 1120.

The cloud server may further include:

a word segmentation and feature extraction module 1111, configured to perform word segmentation on the text content, and extract text features based on the word segmentation result;

an emotion label determination module 1112, configured to construct an input vector using the text features, perform classification using an emotion classification model to determine an emotion label for the text content;

a confidence level evaluation module 1113, configured to, after the emotion label of the text content are determined by the emotion classification model, calculate a confidence level of the text content belonging to the emotion label according to the emotion classification model, and evaluate whether to call the emoji obtaining module 1114;

when the confidence level is greater than a threshold, call the emoji obtaining module 1114; otherwise, inform the client to call the traditional input mode module;

an emoji obtaining module 1114, configured to obtain, from the emoji resource data, first emojis corresponding to the emotion label; and a sorting module 1115, configured to sort the obtained first emojis, and return the sorted emojis to the client.

The client 1120 may include:

a content obtaining module 1121, configured to obtain a text content according to an input sequence;

an environment evaluation module 1122, configured to evaluate whether a current input environment of the input method client needs emoji input; and when the emoji input is needed, send the text content to the cloud server;

a presentation module 1123, configured to, receive the sorted first emojis from the cloud server, and display the sorted emojis as candidate options in the client.

Various component in embodiments of the present disclosure may be implemented by hardware, by software modules operating on one or more processors, or by a combination thereof. It will be appreciated by those skilled in the art that, some or all of the functions of some or all of the components of the client or server according to embodiments of the present disclosure may be implemented using a microprocessor or a digital signal processor (DSP) in practice. The present disclosure may also be implemented as a device or device program (e.g., a computer program and a computer program product) for performing a part or all of the methods described herein. Such program that implements the present disclosure may be stored on a computer-readable medium, or may have the form of one or more signals. Such signals may be downloaded from websites on the Internet, provided on the carrier signal, or provided in any other forms.

Figure 12:
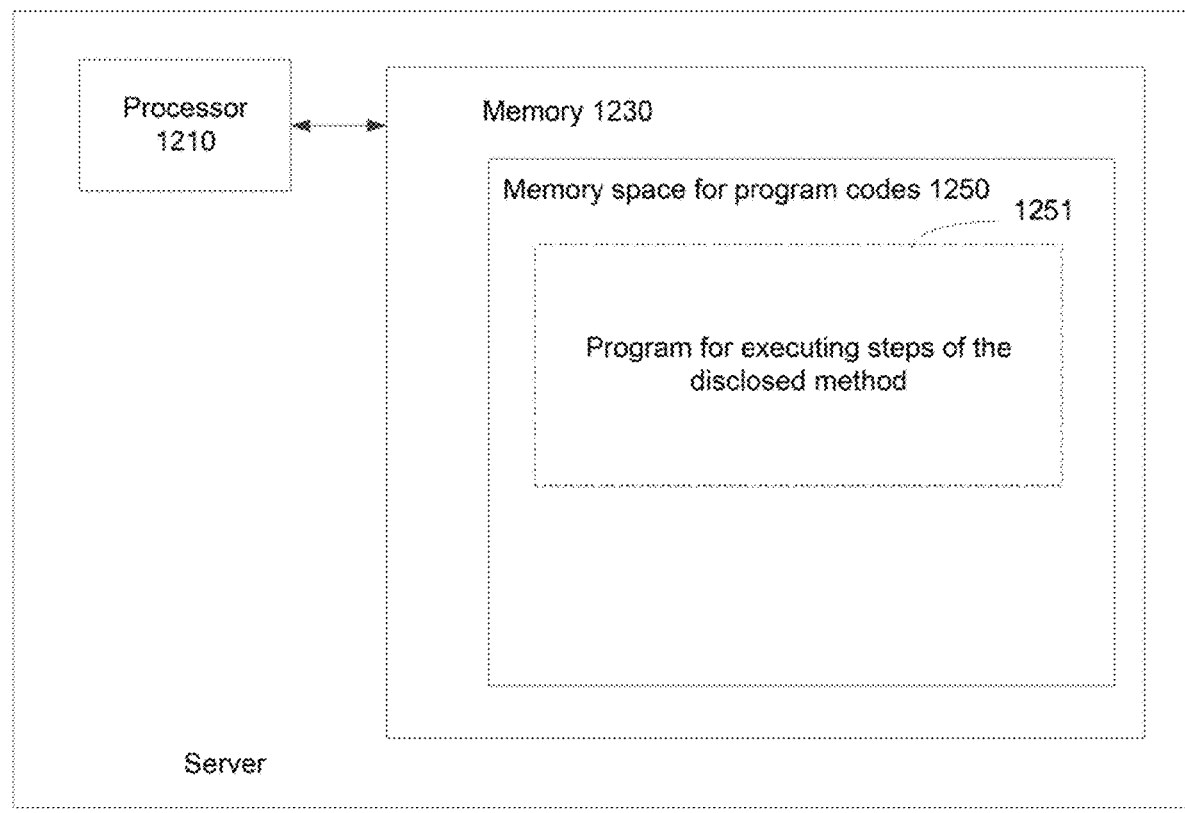
FIG. 12 schematically illustrates a block diagram of a server configured to execute a method according to the present disclosure.

For example, FIG. 12 schematically illustrates a block diagram of a server configured to execute the method according to the present disclosure, such as a cloud server.

Figure 13:
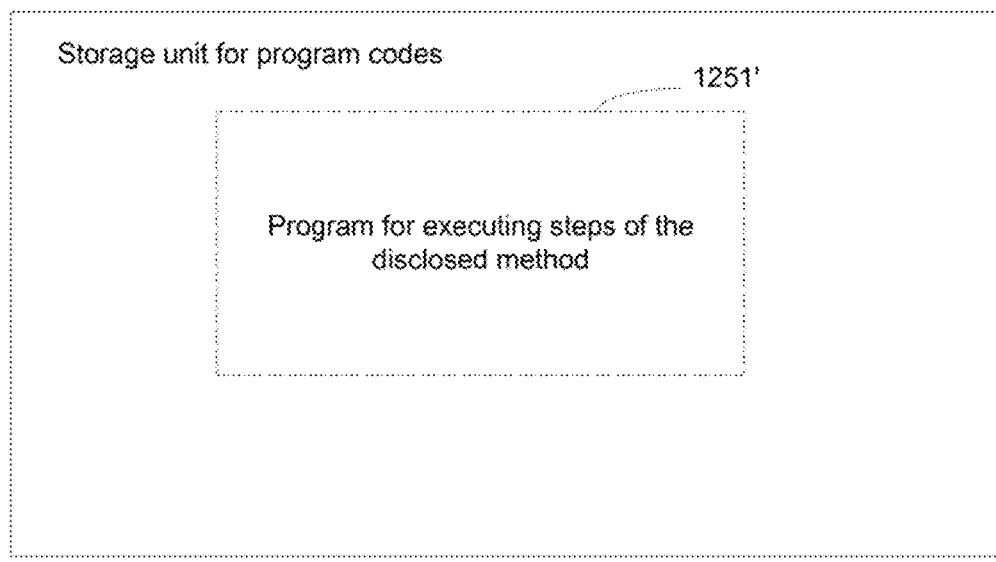
FIG. 13 illustrates an exemplary memory unit configured to hold or carry the program code for implementing a method according to the present disclosure.

The server traditionally includes processor 1210 and memory 1230 in the form of a computer program product or computer readable medium. Memory 1230 may be an electronic memory such as a flash memory, an EEPROM (Electrically Erasable Programmable Read Only Memory), an EPROM, a hard disk, or a ROM. Memory 1230 has a memory space 1250 for program code 1251 that performs any of the disclosed method steps described above. For example, the memory space 1250 for program code may include respective program codes 1251 for implementing each of the various steps in the above disclosed method. These program codes may be read from one or more computer program products or written to the one or more computer program products. The computer program products include program code carriers such as hard disks, compact disks (CDs), memory cards, or floppy disks. Such computer program product is typically a portable or fixed storage unit as described with reference to FIG. 13. The storage unit may have a storage segment, a storage space or the like which is arranged similarly to memory 1230 of the server as shown in FIG. 12. The program codes may, for example, be compressed in an appropriate form. Generally, the storage unit includes computer readable codes 1251', i.e., codes that can be read by a processor such as processor 1210. When being executed by a server, these codes cause the server to perform the steps in the method described above.

"One embodiment", "embodiments", or "one or more embodiments" as used herein, means that a particular feature, structure, or characteristic described in accordance with an embodiment is included in at least one embodiment of the present disclosure. In addition, it should be noted that the example phrase "in one embodiment" does not necessarily refer to a same embodiment.

In the specification provided herein, numerous specific details are described. It should be understood, however, embodiments of the present disclosure may be practiced without these specific details. In some instances, well-known methods, structures, and techniques have not been shown in detail to avoid obscuring the understanding of this specification.

It is to be noted that the above-described embodiments are used to explain the present disclosure, and are not intended to limit the present disclosure, and those skilled in the art may devise alternative embodiments without departing from the scope of the appended claims. In the claims, any reference signs placed between parentheses shall not be construed as limiting the claim. The word "include/comprise" does not exclude the presence of elements or steps that are not listed in the claims. The word "a" or "an" preceding an element does not exclude the presence of a plurality of such elements. The present disclosure may be implemented by hardware consisting of different elements, and by a properly programmed computer. In a unit claim that enumerates several modules, some of the several modules may be implemented by a same hardware component. Words such as first, second, third and so on should not be construed as indicating any sequences. These words may be interpreted as names.

Furthermore, it should also be noted that the language used in this specification is selected primarily for readability and teaching purposes, and not for the purpose of explaining or limiting the subject matter of the present disclosure. Accordingly, many modifications and variations will be apparent to those of ordinary skill in the art without departing from the scope and spirit of the appended claims. The disclosure of the invention is illustrative, but not limiting, with a true scope and spirit of the invention being indicated by the claims.

What is claimed is:

1. A semantic understanding based emoji input method implemented by at least an input method client installed on a user terminal, comprising:

obtaining, by the input method client, a first text content according to an input sequence entered to a graphical user interface of the input method client by a user, the input method client being an independent program that is called by an application of the user terminal in an input scenario, and the first text content including a first candidate text option recognized by the input method client according to the input sequence but not yet entered into the application;

performing, by the input method client, word segmentation on the first text content;

extracting, by the input method client, text features based on the word segmentation result;

constructing, by the input method client, an input vector using the text features;

performing, by the input method client, classification by applying the input vector associated with the first text content to an emotion classification model to determine an emotion label of the first text content, wherein training data of the emotion classification model is obtained from a chat language resource data and an emoji resource data, and the chat language resource data are emoji-containing data obtained from online user chats and comments, such that the emotion classification model is trained based on correspondence relationships extracted from emojis and texts contained in the online user chats and comments to offer precise and up-to-date matching between the emotion label and the first text content, the chat language resource data includes a second emoji and a first keyword corresponding to the second emoji, the emoji resource data includes a first emoji and a second keyword corresponding to the first emoji, and the first keyword and the second keyword are combined to form the emotion label once the second emoji matches the first emoji;

obtaining, by the input method client from the emoji resource data, at least two first emoji-corresponding to the emotion label, wherein the emoji resource data includes a plurality of first emojis from a plurality of emoji package resources, such that the plurality of first emojis are collectively processed, so as to reduce time cost for the user to search for and install emoji packages;

sorting the at least two first emojis in an order of usage frequency to obtain at least two sorted first emoji, wherein the usage frequency is determined according to number of times the first emojis appear in the chat language resource data; and after obtaining the at least two sorted first emoji, displaying, by the input method client, an input section, a text candidate section, and an emoji candidate section on the graphical user interface of the input method client, wherein the input sequence entered by the user is displayed in the input section, the first candidate text option and one or more second candidate text options are displayed in the text candidate section of the graphical user interface, and the at least two sorted first emoji are displayed in the order of usage frequency in the emoji candidate section of the graphical user interface, wherein the at least two sorted first emoji have the same emotion label and are obtained from different emoji packages of the plurality of emoji package resources, such that the user does not need to re-download or update emoji packages when switching input scenarios at different application programs.

2. The method according to claim 1, further comprising:
before obtaining the first text content, establishing, according to the chat language resource data and the emoji resource data, correspondence relationships between a plurality of emotion labels with the plurality of emojis in the emoji resource data, including establishing a correspondence relationship between the emotion label and the first emoji.

3. The method according to claim 2, wherein establishing a correspondence relationship between the emotion label and the first emoji further comprises:
obtaining the chat language resource data and the emoji resource data, wherein the chat language resource data includes a second emoji and a second text content associated with the second emoji;
according to the second emoji and the second text content associated with the second emoji included in the chat language resource data, performing classification on the first emoji in the emoji resource data; and
based on the classification result of the first emoji, establishing the correspondence relationship between the emotion label and the first emoji.

4. The method according to claim 3, wherein according to the second emoji and the second text content associated with the second emoji included in the chat language resource data, performing classification on the first emoji in the emoji resource data further comprises:
according to the second emoji and the second text content associated with the second emoji included in the chat language resource data, mining the first keyword corresponding to each first emoji in the emoji resource data; and
according to the first keyword corresponding to the first emoji and the second keyword under each emoji category, determining an emoji category for the first emoji.

5. The method according to claim 4, wherein according to the second emoji and the second text content associated with the second emoji included in the chat language resource data, mining a first keyword corresponding to each first emoji in the emoji resource data further comprises:
applying a symbol matching rule and a picture content evaluation rule to extract the second emoji and the second text content associated with the second emoji from the chat language resource data;
searching, in the emoji resource data, the first emoji that matches with the second emoji;
correlating the first emoji with the second text content associated with the second emoji; and
mining, from the second text content, the first keyword that corresponds to the first emoji.

6. The method according to claim 5, wherein according to the first keyword corresponding to the first emoji and the second keyword under each emoji category, determining an emoji category for the first emoji further comprises:
for a successfully-matched first emoji, based on the second keyword under each emoji category in the emoji resource data, performing an emotion classification prediction on the first keyword corresponding to the first emoji, and determining the emoji category for the first emoji; and for a first emoji that does not have a successful match, based on the second keyword under each emoji category in the emoji resource data, determining the emoji category for the first emoji, wherein the first keyword corresponding to the first emoji is empty.

7. The method according to claim 4, wherein based on the classification result of the first emoji, establish a correspondence relationship between the emotion label and the first emoji further comprises:
establishing the correspondence relationship between the emotion label and the first emoji after the emotion label is formed via combining the first keyword and the second keyword.

8. The method according to claim 2, wherein after the emotion label of the first emoji is determined, and before the correspondence relationship between the emotion label and the first emoji is established, the method further comprises:
determining a synonym of the emotion label;
obtaining, from the emoji resource data, an emoji corresponding to the synonym; and
integrating the emoji corresponding to the synonym, establishing a correspondence relationship between the emotion label and the first emoji.

9. The method according to claim 5, wherein steps for constructing the emotion classification model comprises:
according to a matching relationship between the first emoji and the second emoji, obtaining, from the chat language resource data, the second text content correlated with the first emoji;
extracting natural language text features from the second text content correlated with the first emoji; and
generating a training sample according to the emotion label and the natural language text features corresponding to the first emoji, and training the emotion classification model.

10. The method according to claim 1, wherein after determining the emotion label for the first text content, the method further comprises:
according to the emotion classification model, calculating a confidence level of the emotion label for the first text content; and
when the confidence level is greater than a preset threshold, executing the step of obtaining the first emoji corresponding to the emotion label from the emoji resource data.

11. The method according to claim 2, wherein the plurality of emoji package resources include at least one of: emoji packages of multiple themes obtained by the input method client from the Internet, a customized emoji package added by a user of the input method client, or an emoji package cooperatively produced by a developer of the input method client and a third-party emoji producer.

12. The method according to claim 1, wherein:
the input sequence entered by the user includes characters of a first language; and
the first candidate text option and one or more second candidate text options displayed in the text candidate section include characters of a second language different from the first language.

13. The method according to claim 1, wherein obtaining the at least two first emoji includes:
obtaining a subset of the plurality of first emojis, each of the subset representing an emotion; and
obtaining the at least two first emojis from the subset.

14. The method according to claim 1, wherein obtaining the emotion classification model further includes:

prior to combining the first keyword and the second keyword to form the emotion label, determining that the first keyword has a usage frequency greater than a preset threshold.

15. The method according to claim 1, further comprising: prior to obtaining the first text content, obtaining the emotion classification model.

16. A semantic understanding based emoji input device, comprising: a memory; and a processor coupled to the memory; wherein the processor executes an input method client and is configured to:
obtain, by the input method client, a first text content according to an input sequence entered to a graphical user interface of an input method client by a user, the input method client being installed on the semantic understanding based emoji input device, the input method client being an independent program that is called by an application of the user terminal in an input scenario, and the first text content including a first candidate text option recognized by the input method client according to the input sequence but not yet entered into the application;
perform, by the input method client, word segmentation on the first text content, and extract text features based on the word segmentation result;
construct, by the input method client, an input vector using the text features;
perform classification by applying the input vector associated with the first text content to an emotion classification model to determine an emotion label of the first text content, wherein training data of the emotion classification model is obtained from a chat language resource data and an emoji resource data, and the chat language resource data are emoji-containing data obtained from online user chats and comments, such that the emotion classification model is trained based on correspondence relationships extracted from emojis and texts contained in the online user chats and comments to offer precise and up-to-date matching between the emotion label and the first text content the chat language resource data includes a second emoji and a first keyword corresponding to the second emoji, the emoji resource data includes a first emoji and a second keyword corresponding to the first emoji, and the first keyword and the second keyword are combined to form the emotion label once the second emoji matches the first emoji;
obtain, by the input method client from the emoji resource data, at least two first emoji corresponding to the emotion label, wherein the emoji resource data includes a plurality of first emojis from a plurality of emoji package resources, such that the plurality of first emojis are collectively processed, so as to reduce time cost for the user to search for and install emoji packages;
sort the at least two first emoji in an order of usage frequency to obtain at least two sorted first emoji, wherein the usage frequency is determined according to number of times the first emojis appear in the chat language resource data; and
after obtaining the at least two sorted first emoji, display, by the input method client, an input section, a text candidate section, and an emoji candidate section on the graphical user interface of the input method client, wherein the input sequence entered by the user is displayed in the input section, the first candidate text option and one or more second candidate text options are displayed in the text candidate section of the graphical user interface, and the at least two sorted first emoji are displayed in the order of usage frequency in the emoji candidate section of the graphical user interface,
wherein the at least two sorted emoji have the same emotion label and are obtained from different emoji packages of the plurality of emoji package resources, such that the user does not need to re-download or update emoji packages when switching input scenarios at different application programs.

17. The device according to claim 16, wherein the processor is further configured to:
before obtaining the first text content, establish, according to the chat language resource data and the emoji resource data, correspondence relationships between a plurality of emotion labels with the plurality of emojis in the emoji resource data, including establishing a correspondence relationship between the emotion label and the first emoji.

18. The device according to claim 17, wherein the processor is further configured to:
obtain the chat language resource data and the emoji resource data, wherein the chat language resource data includes a second emoji and a second text content associated with the second emoji;
according to the second emoji and the second text content associated with the second emoji included in the chat language resource data, perform classification on the first emoji in the emoji resource data; and
based on the classification result of the first emoji, establish the correspondence relationship between the emotion label and the first emoji.

19. The device according to claim 18, wherein the processor is further configured to:
according to a matching relationship between the first emoji and the second emoji, obtain, from the chat language resource data, the second text content correlated with the first emoji;
extract natural language text features from the second text content correlated with the first emoji; and
generate a training sample according to the emotion label and the natural language text features corresponding to the first emoji, and train the emotion classification model.

20. A non-transitory computer readable storage medium, storing computer program for, when being executed by a processor, performing a semantic understanding based emoji input method implemented by at least an input method client installed on a user terminal, the method comprising:
obtaining, by the input method client, a first text content according to an input sequence entered to a graphical user interface of the input method client by a user, the input method client being an independent program that is called by an application of the user terminal in an input scenario, and the first text content including a first candidate text option recognized by the input method client according to the input sequence but not yet entered into the application;
performing, by the input method client, word segmentation on the first text content;
extracting, by the input method client, text features based on the word segmentation result;
constructing, by the input method client, an input vector using the text features;
performing, by the input method client, classification by applying the input vector associated with the first text content to an emotion classification model to determine an emotion label of the first text content, wherein training data of the emotion classification model is obtained from a chat language resource data and an emoji resource data, and the chat language resource data are emoji-containing data obtained from online user chats and comments, such that the emotion classification model is trained based on correspondence relationships extracted from emojis and texts contained in the online user chats and comments to offer precise and up-to-date matching between the emotion label and the first text content, the chat language resource data includes a second emoji and a first keyword corresponding to the second emoji, the emoji resource data includes a first emoji and a second keyword corresponding to the first emoji, and the first keyword and the second keyword are combined to form the emotion label once the second emoji matches the first emoji;

obtaining, by the input method client from the emoji resource data, at least two first emoji corresponding to the emotion label, wherein the emoji resource data includes a plurality of first emojis from a plurality of emoji package resources, such that the plurality of first emojis are collectively processed, so as to reduce time cost for the user to search for and install emoji packages;

sorting the at least two first emoji in an order of usage frequency to obtain at least two sorted first emoji, wherein the usage frequency is determined according to a number of times the first emojis appear in the chat language resource data; and after obtaining the at least two sorted first emoji, displaying, by the input method client, an input section, a text candidate section, and an emoji candidate section on the graphical user interface of the input method client, wherein the input sequence entered by the user is displayed in the input section, the first candidate text option and one or more second candidate text options are displayed in the text candidate section of the graphical user interface, and the at least two sorted first emoji are displayed in the order of usage frequency in the emoji candidate section of the graphical user interface, wherein the at least two sorted emoji have the same emotion label and are obtained from different emoji packages of the plurality of emoji package resources, such that the user does not need to re-download or update emoji packages when switching input scenarios at different application programs.

21. The non-transitory computer-readable medium of claim 20, wherein the method further comprises:

before obtaining the first text content, establishing, according to the chat language resource data and the emoji resource data, correspondence relationships between a plurality of emotion labels with the plurality of emojis in the emoji resource data, including establishing a correspondence relationship between the emotion label and the first emoji.

* * * * *